C. P. JOHNSON.
SHOCK ABSORBER.
APPLICATION FILED JUNE 17, 1913.

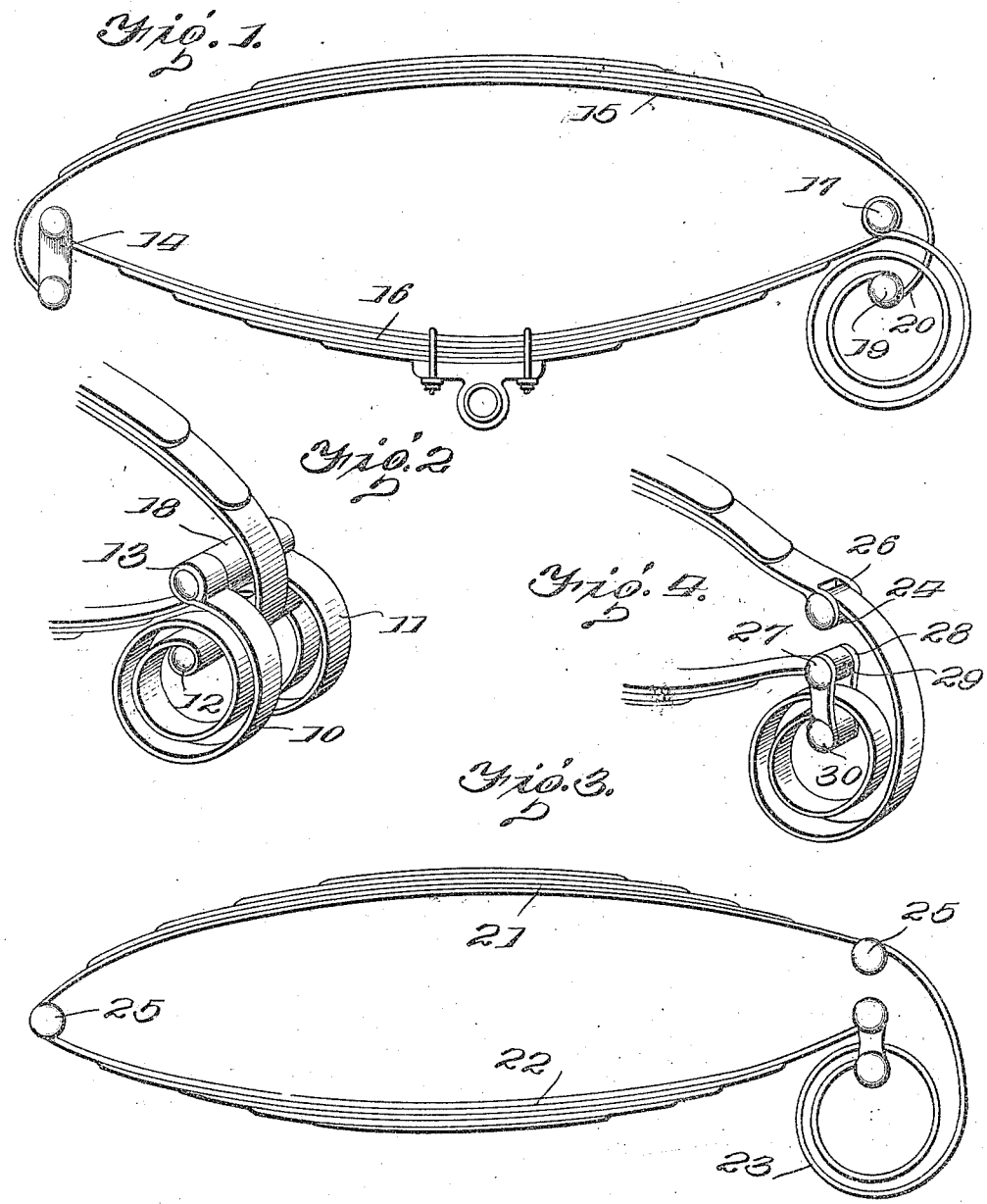

1,093,187.

Patented Apr. 14, 1914.
2 SHEETS—SHEET 2.

Inventor
C. P. Johnson

Witnesses

UNITED STATES PATENT OFFICE.

CHRIS P. JOHNSON, OF SAN FRANCISCO, CALIFORNIA.

SHOCK-ABSORBER.

1,093,187.    Specification of Letters Patent.    Patented Apr. 14, 1914.

Application filed June 17, 1913. Serial No. 774,166.

*To all whom it may concern:*

Be it known that I, CHRIS P. JOHNSON, a citizen of the United States, residing at San Francisco, in the county of San Francisco and State of California, have invented certain new and useful Improvements in Shock-Absorbers, of which the following is a specification.

My invention relates to new and useful improvements in shock absorbers, more particularly shock absorbers for self-propelled vehicles, and the object of my invention is to provide a shock absorber in the form of one or more spiral springs so formed that with comparatively slight changes it may be employed in connection with the common type of elliptic springs now in use.

A further object of my invention is to so construct the shock absorber that it will act not only to cushion the rebound of the vehicle, but also to assist the regular springs in cushioning the downward movement of the vehicle body. And a still further object of my invention is to provide a shock absorber which, while acting to prevent both transverse and lateral swaying of the vehicle body with respect to the running gear, will not be a positive lock against such swaying and will not therefore be liable to breakage when roughly used.

With these and other objects in view, my invention will be more fully described, illustrated in the accompanying drawings, and then specifically pointed out in the claims which are attached to and form a part of this application.

Figure 5:
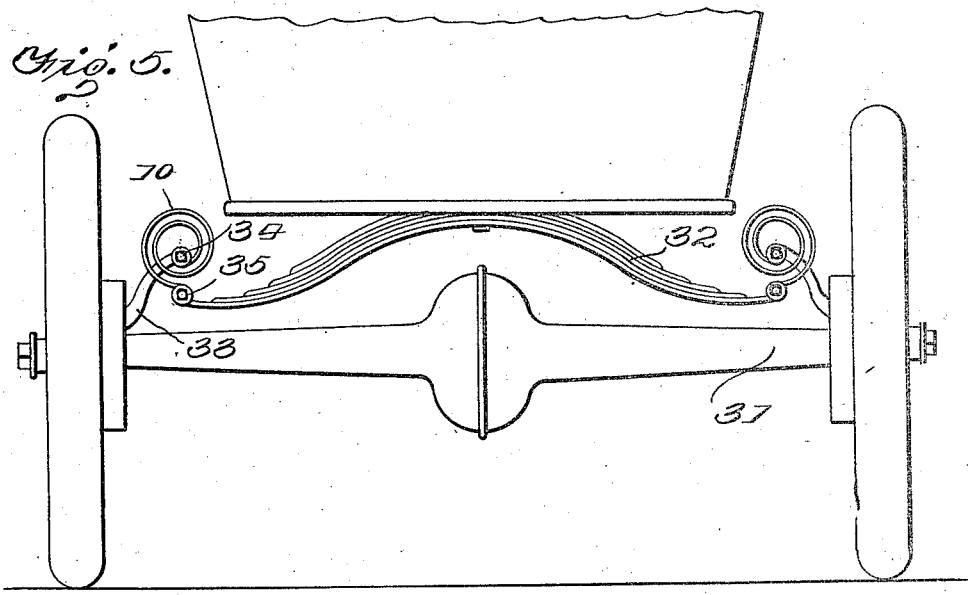
Figure 6:
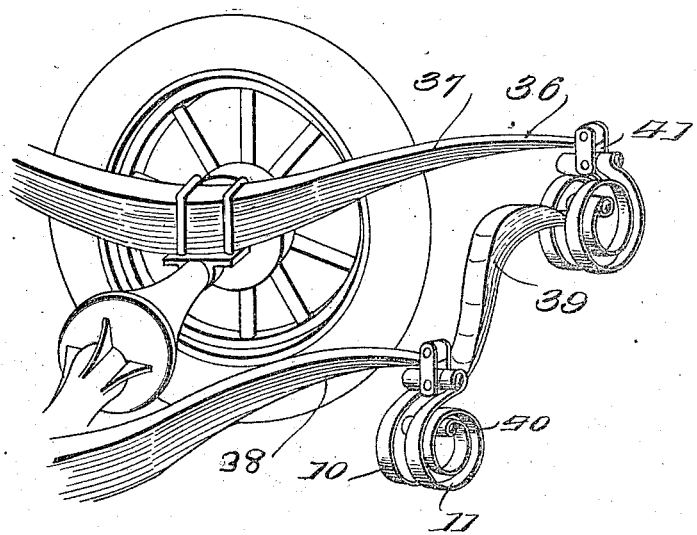

In the drawings: Figure 1 is a side elevation of a double spring type of my shock absorber employed with springs of the double scroll pattern; Fig. 2 is a fragmentary perspective view of the shock absorber shown in Fig. 1; Fig. 3 is a side elevation of my shock absorber of the single spring type employed in connection with a spring of the full elliptic pattern; Fig. 4 is a fragmentary perspective view of the form of shock absorber shown in Fig. 3; Fig. 5 is a fragmentary rear elevation of a vehicle showing the employment of my double spring type shock absorber in connection with an inverted, half elliptic cross spring; Fig. 6 is a fragmentary perspective view of my double spring type of shock absorber employed in connection with a platform spring, two shock absorbers being employed, one between the rear ends of each of the half elliptic springs and the adjacent ends of the inverted cross spring.

Corresponding and like parts are referred to in the following description and indicated in all the views of the drawings by the same reference characters.

Each of my improved shock absorbers, as shown in the various figures of the drawings, includes either one or two spiral springs employed in conjunction with one or more elliptic springs.

In the form shown in Figs. 1 and 2 of the drawings a pair of spiral springs 10 and 11 are employed, each spring being loosely wound and the inner end of each spring being bent inwardly upon itself to form an eye 12, while the outer end of each spring is bent outwardly upon itself to form an eye 13, the convolutions of the spring being so proportioned that under normal strain both these eyes will lie in a common line drawn through the center of curvature of the spring. A spring having two or three convolutions is preferred and the strength of the spring may of course be varied by varying the temper of the steel, the thickness of the band forming the spring and the width thereof. For this reason, the springs may be constructed for use with any size and weight of vehicle.

In employing the above type of shock absorber with springs of the double scroll elliptic type shown in Fig. 1, that one of the double links 14 which swingingly connects the rear ends of the upper and lower springs 15 and 16 is removed and the two springs, positioned one upon either side of the elliptic springs, substituted in its place, being secured by a bolt 17 passed through the eyes 13 of the spiral springs and through the eye 18 of the lower spring 16 and by a bolt 19 passed through the eyes 12 of the spiral springs and the eye 20 of the upper elliptic spring.

From the foregoing description, in connection with Figs. 1 and 2, it will be apparent that any movement of the elliptic springs 15 and 16 toward each other will tend to open up the spiral springs 10 and 11, while any movement of the elliptic springs away from each other will tend to tighten the spiral springs, the spiral springs offering the greatest resistance to this latter movement and therefore acting more strongly to cushion the rebound of the vehicle than the downward movement of its body.

In Figs. 3 and 4 I have illustrated the employment of my single spring type of shock absorber in connection with a double elliptic spring, the elliptic springs being indicated by the numerals 21 and 22. The spiral spring 23 forming this type of shock absorber is practically identical in construction with the springs 10 and 11 except that its outer end is sprung slightly away from the body of the spring and then bent inwardly upon itself to form an eye 24 instead of outwardly. The spring has two convolutions the same as the springs 10 and 11 and the ends are in a line drawn through the center of curvature of the spring. In applying this type of shock absorber to the pattern of spring shown in Figs. 3 and 4, the bolt 25 connecting the rear ends of the elliptic springs is removed and the eye 24 of the outer end of the spiral spring positioned between the perforated ears 26 at the rear end of the upper elliptic spring 21 when the bolt 25 is again passed through said ears and the eye 24 to secure the outer end of the spiral spring to the rear end of the upper elliptic spring. A bolt 27 is passed through the perforated ends of links 28 similar to the links 14 shown in Figs. 1 and 2 and through the eye 29 at the rear end of the lower elliptic spring. The inner end of the spiral spring is positioned between the perforated free ends of the links 28 and secured by a bolt 30. It will therefore be seen that the spiral spring is pivotally connected to one elliptic spring and pivotally connected by a swinging link to the other elliptic spring. Its action is practically the same as that of the double spring type illustrated in Figs. 1 and 2. The single type of spring should, however, be made wider and thicker to give it the necessary strength.

In Fig. 5 I have illustrated a method by which the shock absorber of the double spring type may be employed between the rear axle 31 of a vehicle and the ends of an inverted half elliptic cross spring 32. As shown in this figure the shock absorbers are mounted between the ends of the half elliptic spring and brackets carried by the rear axle casing. These brackets 33 may be of any suitable type and extend upwardly and inwardly terminating in perforated eyes, the two springs 10 and 11 illustrated in Fig. 2 and previously described being positioned one upon either side of the eyes and a bolt 34 being passed through the eyes 12 and the eyes of the brackets. A bolt 35 is then passed through the eyes 13 of the spiral springs and the eyes at the ends of the half elliptic spring 32.

In Fig. 6 I have illustrated the double spring shock absorber employed in connection with a conventional form of platform spring 36 in including the two half elliptic springs 37 and 38 and the half elliptic, inverted cross spring 39, the shock absorbers in this case being shackled between the rear ends of the side springs and the adjacent ends of the inverted spring. The inner ends of the springs 10 and 11 are secured to the ends of the inverted spring by bolt 40, while the outer ends of the springs are swingingly secured by shackles 41 to the rear ends of the adjacent side springs.

It should be noted that in all instances the springs forming the shock absorber, when in place, have their terminals disposed in vertical alinement with each other and it should further be noted that the inner terminal of the spring is in each case eccentrically disposed within the inner convolution or whirl, being located between the center of the whirl and the outer end of the spring. Furthermore, the shock absorber, when secured in place between the semi-elliptic springs or between the semi-elliptic spring and brackets, always lies at one side or the other, that is either above or below the spring or one of the springs to which it is secured.

From the foregoing description it will be apparent that all forms of the shock absorber are practically identical and that in every case the shock absorber operates in substantially the same manner.

Of course the various figures illustrate only a few of the many ways in which shock absorbers of the above types may be employed, but it will be understood that I do not wish in any way to limit myself entirely to its use in the various ways shown or to even limit myself to the exact details of construction of the shock absorbers themselves, as any changes, within the scope of the appended claims, may be made at any time without in the slightest degree departing from the spirit of my invention.

Having thus described the invention, what is claimed as new is:

1. A shock absorber including a spiral spring, the ends of which are adapted for attachment to relatively movable parts of a vehicle, the inner end of the spring being disposed eccentrically within the inner whirl thereof.

2. In a shock absorber, the combination with a semi-elliptic spring, of a pair of spiral springs, pivotal connecting means passed through the outer end of the spiral springs and one end of the semi-elliptic spring to secure the spiral springs one upon either side of the semi-elliptic spring, and means for attaching the inner ends of the spiral springs to a relatively movable part of a vehicle body, the inner ends of the spiral springs being disposed eccentrically of the inner whirls thereof.

In testimony whereof I affix my signature in presence of two witnesses.

CHRIS P. JOHNSON. [L. S.]

Witnesses:
 A. J. HENRY,
 A. R. HANSEN.